United States Patent [19]

Hunter et al.

[11] Patent Number: 5,417,103

[45] Date of Patent: May 23, 1995

[54] METHOD OF DETERMINING MATERIAL PROPERTIES IN THE EARTH BY MEASUREMENT OF DEFORMATIONS DUE TO SUBSURFACE PRESSURE CHANGES

[76] Inventors: Roger J. Hunter, 3100 Ashero, Apt. 163, Bakersfield, Calif. 93309; Richard F. Reinke, 32180 25th St., Mattawan, Mich. 49071

[21] Appl. No.: 150,697

[22] Filed: Nov. 10, 1993

[51] Int. Cl.⁶ .................................................. G01N 19/02
[52] U.S. Cl. ...................................... 73/37; 73/807; 73/155; 304/330; 166/250; 175/58
[58] Field of Search ............... 73/37, 155, 151, 804, 73/807, 806; 324/323, 353, 330; 166/308, 250; 175/58

[56] References Cited

U.S. PATENT DOCUMENTS

| | | | |
|---|---|---|---|
| 3,741,653 | 6/1973 | Svetlinchny | 324/330 |
| 4,271,696 | 6/1981 | Wood | 73/37 |
| 4,353,244 | 10/1982 | Wood | 73/37 |
| 4,698,759 | 10/1987 | Eliason et al. | 324/323 |
| 4,799,550 | 1/1989 | Harris et al. | 166/308 |
| 4,832,121 | 5/1989 | Anderson | 166/250 |
| 4,836,280 | 6/1989 | Soliman | 166/250 |
| 4,869,322 | 9/1989 | Vogt, Jr. et al. | 166/308 |
| 4,887,670 | 12/1989 | Lord et al. | 166/308 |
| 5,310,003 | 5/1994 | Jennings | 166/308 |

Primary Examiner—Thomas P. Noland
Assistant Examiner—J. David Wiggins

[57] ABSTRACT

This invention relates to a method of determination of the deformation of the surface or subsurface of the earth resulting from an applied pressure change at a selected point, at a selected depth, in the earth, by measuring at least one physical parameter of the deformation above the point of application of pressure change. The method involves positioning a plurality of tiltmeters on or below the surface of the earth above the point of application of pressure change arranged in a known array, and measuring the change of angle of tilt of earth's surface or subsurface at the point of placement of each sensor while varying the pressure and flow rate of fluid into or out of the earth at the selected point. This invention further teaches how the individual values of incremental tilt at selected points on or below the earth's surface can be processed to determine material properties at selected points in the earth.

9 Claims, 7 Drawing Sheets

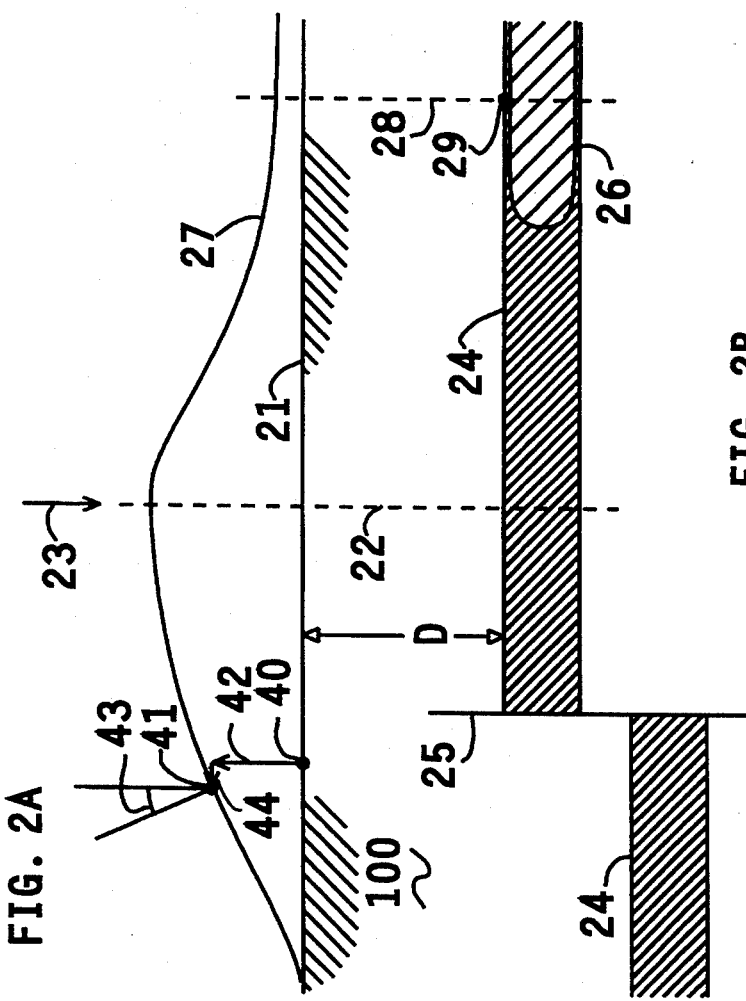

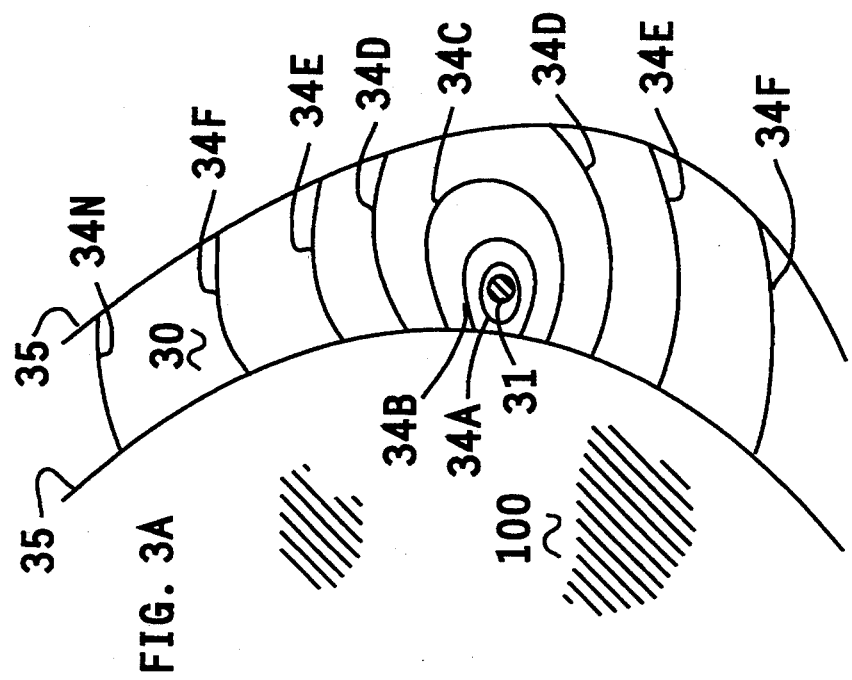

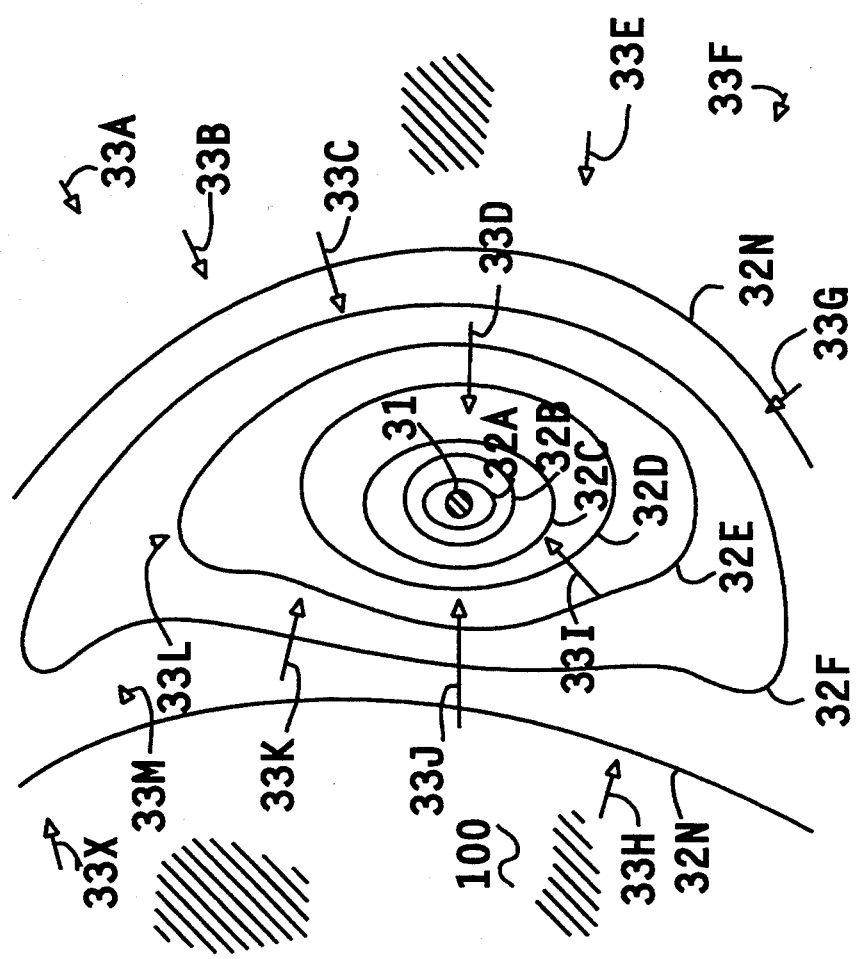

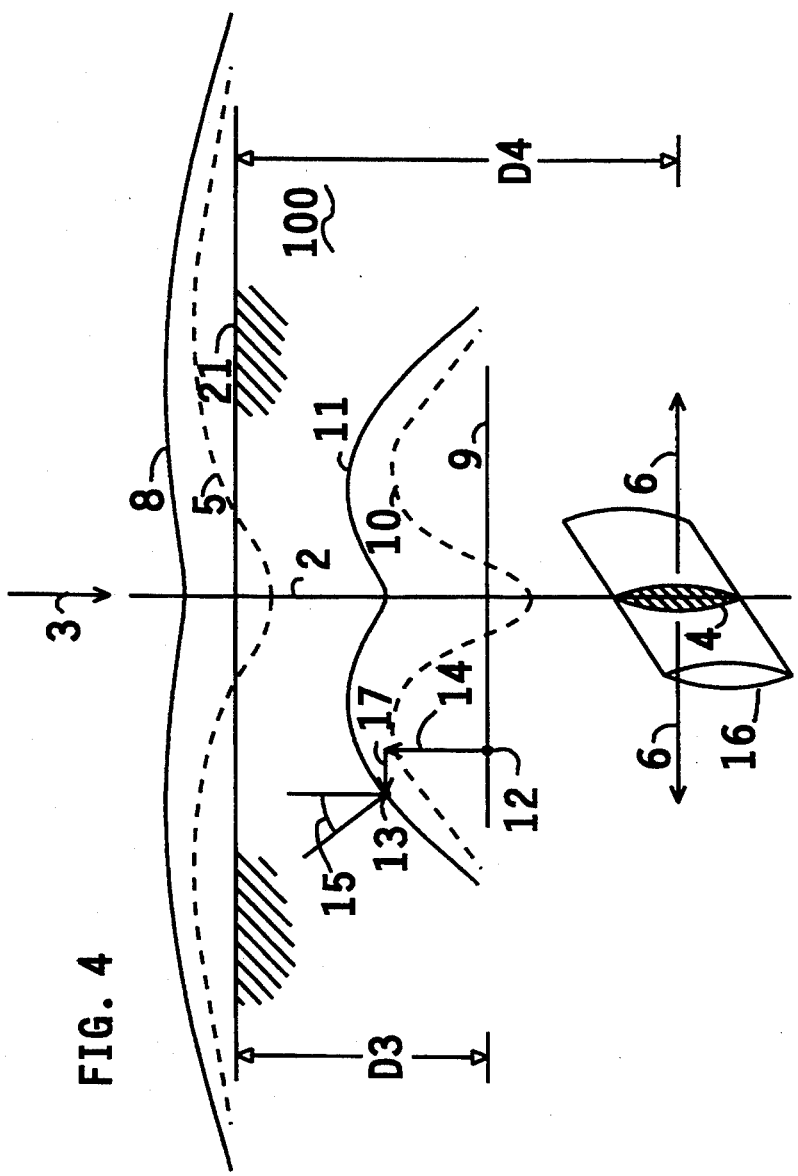

METHOD OF DETERMINING MATERIAL PROPERTIES IN THE EARTH BY MEASUREMENT OF DEFORMATIONS DUE TO SUBSURFACE PRESSURE CHANGES

BACKGROUND—FIELD OF INVENTION

This invention relates to the fields of geophysics, hydrology, and petroleum reservoir engineering. Specifically it relates to methods in which parameters relating to changes in subsurface pressure or fluid flow rates are measured, and the measured values of such parameters are used to determine material properties in the earth.

BACKGROUND—DESCRIPTION OF PRIOR ART

When a well is drilled, it can be of great economic importance to determine the properties of any porous layers which the well penetrates. In the energy industry, this information may be critical in deciding how thee hydrocarbons can be most efficiently recovered. If a zone has been contaminated with toxic waste, then it is important to determine the continuity of the zone in various directions to ensure a proper clean up. In this latter case it may also be important to minimize the number of wells, not just for economic reasons but because each well presents a potential path for toxics to migrate into a previously uncontaminated zone.

During the in situ clean up of a contaminated zone, or production of an oil field or aquifer, it is desirable to know how the fluids are actually moving in the subsurface. If they are not moving in the desired direction then this should be determined as soon as possible. The taking of samples at monitoring wells may only indicate a problem after the damage is done, for instance by the detection of contaminants in a previously uncontaminated area.

Logging tools may be lowered into the well, which measure various properties of the rocks and fluids around the well. Logging tools have the disadvantage that they can only investigate properties within a few feet of the well. Any time a tool is lowered into a well there is a chance that it may get stuck or be lost, and the cost of retrieving the tool or clearing the well bore may be significant.

Well testing involves the measurement of the transient fluid pressure response to change in flow rate at a well, for the purpose of determining material properties in porous zones around the well. Pressure is commonly measured at the well head. A great many types of single and multiple well testing procedures have been devised and are well known in the art. These well testing, or pressure transient, methods are generally limited to diagnosing rather simple reservoir geometries and have the additional disadvantage that even if they do detect variation in reservoir properties (such as a no flow boundary) they cannot determine the direction in which it occurs. The use of separate observation wells can be of benefit, but these must be wells of opportunity since the cost of drilling wells purely for observation can seldom be justified. In many cases it is necessary to lower a pressure sensor into the well to obtain a reliable pressure measurement.

A further disadvantage of methods which rely upon the measurement of pressure in one or more wells is that the pressure in a well is highly dependent upon the behaviour of fluids in the well itself. Take for instance a common type of well test in which the rate of flow at some point in the flow stream is reduced to zero by the closure of a valve. In this case there may continue to be a flow into (or out of) the well for a period of time after the closure of the valve due to the compressibility of the fluids in the well. This effect is aggravated if one of the fluids is a gas. While the flow rate may be small it can have a significant effect on the rate of change of pressure in the well. This effect is known in the art as afterflow and it can have a serious adverse effect upon the analysis of the well test data.

Methods of reducing afterflow are generally limited to the installation of one or more valves at some depth in the well, which may involve considerable cost as well as the potential cost of replacing faulty valves.

Another, similar, problem arises when the well contains immiscible fluids (such as oil, gas, and water) of different densities. In this case the fluids tend to segregate when the flow rate is reduced and to mix when the flow rate is increased, as a result of which the average density of the fluids above or below a point in the well, and hence the pressure at that point, will change purely due to segregation or desegration. Matters may become even more complicated if the miscibility or solubility of components in the flow stream varies with pressure, or if evaporation or condensation occurs.

Temperature changes in the well resulting from changes in flow rate will also effect fluid densities and miscibilities and so on.

The material properties in the rock matter close to the well will generally have a greater influence on the pressure transients observed at the well than will those properties in the rock matter at a greater distance from the well. The properties close to the well can, however, be altered by the drilling of the well itself and by chemical or physical changes resulting from the flow of fluid to or from the well. This is known in the art as the skin effect.

Many analytical and digital methods have been developed to model and analyse pressure transients. These methods are well known in the art.

If fluid is injected into a well at a high enough pressure, changes in the subsurface structure can be created. These are known as hydraulic fractures or more simply as fractures. Suitable materials can be pumped into the fractures so that the fractures remain propped open when the pressure is reduced. These propped fractures then provide conduits for fluid to flow into or out of the well. This process of creating propped fractures is very important in the production of hydrocarbons because it permits the production of reserves which would otherwise not be economical.

The creation of a fracture creates stresses and strains which propagate to the surface of the earth where a measurable deformation can result. U.S. Pat. Nos. 4,271,696 (1981) and 4,353,244 (1982), both to Wood, describe methods of measuring the surface deformation and hence determining some aspects of the geometry of the fractures by the use of a plurality of tiltmeters. The first of these two patents describes one method which may be used to install such tiltmeters in shallow boreholes at the surface of the earth.

Methods of calculating deformations in the subsurface or at the surface resulting from hydraulic fractures are reasonably well known in the art. One such method is described by Xue-Min Yang and Paul M. Davis in the paper "Deformation due to a rectangular tension crack in an elastic half space" in the Bulletin of the Seismological Society of America, Vol. 76, No. 3, pp 865–881, June 1986.

The methods of Wood are limited to certain specialized operations in which fluid pressure is applied to the earth at a selected point, and selected pressures and flow rates, and selected fluid composition, for the purpose of changing the structure or chemical condition of the earth.

In Wood's U.S. Pat. No. 4,353,244 already cited there is an underlying assumption that the only measurable deformations at the earth's surface result from the expansion or contraction of the hydraulic fractures. In practice, when fluid is pumped to create a fracture, some of that fluid leaks out of the fracture and into the porosity of the rock (or 'reservoir'). This process is known as leak off and causes transient pressure increases in the reservoir which in turn cause a small expansion of thee reservoir. This may generate a deformation at the surface of the earth large enough to contaminate the determination of the fracture geometry. Ian D. Palmer describes a method of filtering out this contaminating noise in the paper entitled "Uplifts and tilts a earth's surface induced by pressure transients from hydraulic fractures" in SPE Production Engineering, August 1990 pp 324–332.

Methods of calculating the reservoir expansion (or, for that matter, contraction) resulting from a pressure change in the reservoir are reasonably well known in the art; and one such method is described in the above referenced paper by Palmer.

OBJECTS AND ADVANTAGES

Accordingly, several objects and advantages of the present invention are:
(a) To provide a method and apparatus for pressure transient testing which can determine not just average reservoir properties but can also be used to determine spatial variations in reservoir rock or fluid properties.
(b) To provide a method and apparatus for pressure transient testing which can reduce or eliminate the need to drill monitoring wells into the zone of interest and which can reduce the need to lower tools into the well or wells.
(c) To provide a method and apparatus for pressure transient testing which is less affected by afterflow or fluid segregation in the well bore, or by skin effects than methods which rely on pressure measurements at the well bore.
(d) To provide a method and apparatus for monitoring the movement of fluids in the subsurface, both to reduce the need for other more expensive methods and to detect anomalous behaviour earlier than may be possible with other methods.
(e) To provide a method and apparatus for the mapping of hydraulic fractures, in which the signal due to fluid leak off need not be filtered out as noise but may be used to provide additional useful information.

Further objects and advantages of our invention will become apparent from a consideration of the drawings and ensuing description.

DRAWING FIGURES

In the drawings, closely related figures have the same number but different alphabetic suffixes.

FIG. 2A Shows a vertical cross section through the earth, illustrating non-uniform deformations resulting from a change in injection rate at a well.

FIG. 2B Illustrates the shape of a pressure transient as pressure versus radius from the well.

FIG. 3A Is a horizontal section through the earth, showing the pressure distribution in a reservoir due to production from a well.

FIG. 3B Shows contours of equal subsidence, and vectors of tilt, at a horizontal cross section of the earth between that of FIG. 3A and the surface.

FIG. 4 Shows a vertical cross section through the earth, illustrating deformations due to a hydraulic fracture alone and due to a hydraulic fracture with fluid leak off.

LIST OF ITEMS IN THE DRAWINGS

FIG. 1

Figure 1:
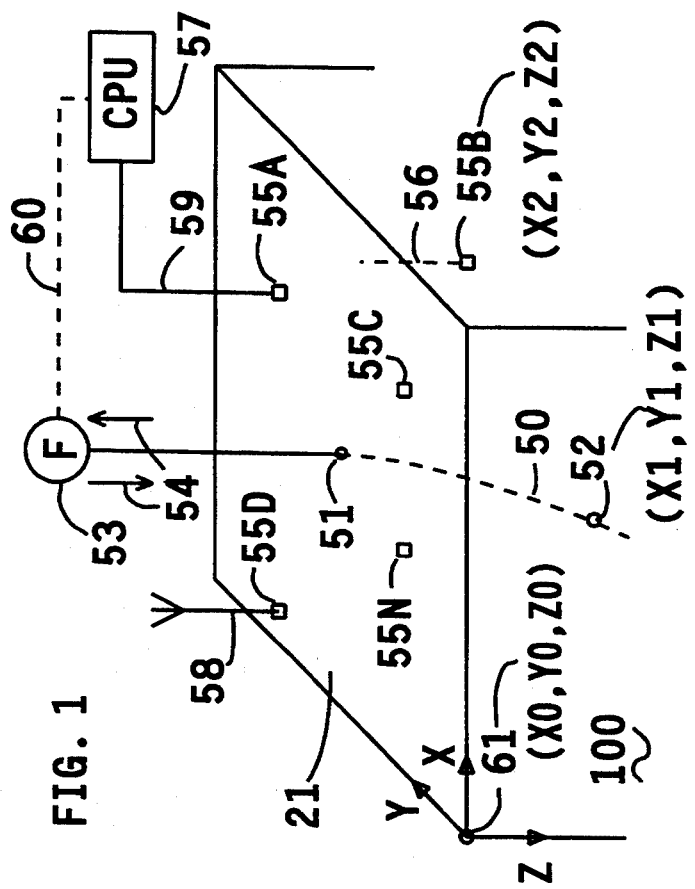
FIG. 1 is a schematic diagram illustrating the component parts of the invention.

21 The surface of the earth
50 A well drilled into the earth
51 Intersection of the well and the surface of the earth
52 A point at the well in the subsurface
53,F, Equipment for controlling and/or measuring fluid flow
54 Fluid flow into or out of the well
55A,55B,55C, . . . 55N An array of sensors above point 52
56 Method for acquiring data from a sub-surface sensor
57 A central processing unit or CPU
58 A radio antenna
59 A wire or cable
60 Fluid flow data
61 Reference point for coordinates
100 The earth
X,Y,Z Coordinate system

FIG. 2A

21 The surface of the earth
22 A well drilled into the earth
23 Injection of fluid into the well
24 A porous zone or reservoir in the subsurface
25 A geological fault in the subsurface
26 A zone of reservoir 24
27 Deformation of surface 21 due to fluid injection
28 A monitoring well
29 A pressure sensor
40 A point on the surface of the earth
41 Position of point 40 after deformation of the surface
42 Vertical displacement of point 40
43 Change in tilt due to deformation of the surface
44 Horizontal displacement of point 40
100 The earth
D Distance of reservoir 24 below surface 21

FIG. 2B

200 Pressure increase in reservoir 24
202 Change in character of curve 200

P Pressure
P0 Initial pressure in reservoir 24
P1,P2,P3 Pressure increase at three points

FIG. 2C

201 Graph of flow rate versus time for well 22
Q1 Fluid injection rate into reservoir
T0 Arbitary time zero
T1 Time of start of fluid injection
T2 A later time, during fluid injection

FIG. 2D

204 Graph of tilt at point 40 versus time
A0 Angle of tilt at time T0
A2 Angle of tilt at time T2
T0 Arbitary time zero
T1 Time of start of fluid injection
T2 A later time during fluid injection

FIG. 3A

30 A reservoir
31 A well drilled into reservoir 30
34A,34B,34C, . . . 34N Contours of equal pressure drop
35 Boundaries of reservoir 30
100 The earth

FIG. 3B

31 Well of FIG. 3A
A,32B,32C, . . . 32N Contours of points of equal subsidence
A,33B,33C, . . . 33X Tilt vectors at various points
The earth

FIG. 4

2 A well drilled into the earth
3 Fluid injected into the well at a high pressure
4 Hydraulic fracture
5 Deformation of earth's surface due to hydraulic fracture
6 Fluid leak off from the fracture
8 Deformation of the earth's surface due to the combined effects of hydraulic fracture and fluid leak off
9 A horizontal plane in the subsurface
10 Deformation of the plane due to hydraulic fracture
11 Deformation of the plane due to the combined effects of hydraulic fracture and fluid leak off
12 A point on the plane
13 Point on deformed surface 11 to which point 12 moves
14 Vertical displacement of the point
15 Change of tilt at the point
16 Three dimensional representation of hydraulic fracture
17 Horizontal displacement of the point
21 Surface of the earth
100 The earth
D3 Depth to plane 9
D4 Depth to hydraulic fracture

FIG. 5

70 Set up simulation model
71 Input measured data valves
72 Calculate theoretical data values
73 Evaluate merit functions
74 Make new estimate of parameter values
75 Test for convergence
76 Yes, convergence criteria met
77 No, convergence criteria not met
78 Finished

DESCRIPTION—FIGS. 1 TO 5

The earth is not a homogeneous solid, but rather comprises many nominally horizontal layers. These layers may contain zones which are not completely solid but contain interconnected voids and therefore have a permeability to fluid flow. Such zones may be more or less continuous in any given direction, and are themselves not homogeneous.

The voids in these zones contain one or more fluids which may be liquids or gases, and such zones are commonly referred to as reservoirs. The proportion of the total volume which is occupied by voids, or pores, is known as the porosity. A numerical value may also be ascribed to the permeability, describing the ease with which fluid can flow through the pore space. The size of the pores and the value of the permeability can both vary by many orders magnitude. Consider, for instance, a siltstone in which the pores are microscopic and whose permeability is minute. By contrast for instance, some volcanic rocks and limestones contain pores which are many feet in diameter, and whose permeability is very great although the rock porosity may be small.

At any point in the earth, at any time, there will be a certain stress field as a result of geological processes, gravitational forces, and so on. The materials in the earth are neither infinitely rigid nor infinitely strong, but follow stress-strain curves. A change in stress or pressure will cause deformation or even mechanical failure of solids, and flow of liquids, in the earth. All of this is well known in the art.

If there is, say, a certain increase or decrease in pressure at a point in a reservoir, then there will be a consequent change in the stress field around that point, which will extend for a considerable distance in all directions and particularly upward towards the surface of the earth. This stress field will vary with time, both because stresses are not transmitted instantaneously throughout the medium, and because a pressure transient will propagate away from the point of initiation of the pressure change and through the pore space at a finite rate.

Thus there will be deformation of the materials around and above the point of the pressure change, which will vary with time. The deformation will be dependent upon the magnitude of the pressure change and the properties of the materials in the earth, and particularly those properties such as, for instance, permeability which control the manner in which the pressure transient propagates.

If, by contrast, fluid pressure is applied to a point in the earth, and the fluid pressure is raised to a selected value great enough to exceed both the strength of the rock and the local stress field, then a cavity will form which will be filled with the pressurized fluid. Such a cavity is commonly known as a fracture or hydraulic fracture in the art. If the pressure is maintained, liquid will continue to flow into the fracture and the fracture will increase in volume.

If the rock surrounding the fracture has a zero permeability to the pressurized fluid, then the volume of the fracture will be equal to the volume of the pressurized fluid which has entered it. There will be a change in the stress field around the fracture, which will extend a considerable distance in all directions and particularly upwards towards the surface of the earth. This will cause deformation in the materials around and above the fracture which will depend upon the dimensions and orientation of the fracture and upon the material properties in the earth.

If the rock surrounding the fracture has a non-zero permeability to the pressurized fluid, as is commonly the case, then some of that fluid will leak out of the fracture into the naturally occurring pore space in the rock around the fracture, causing pressure transients. In this case the changes in the stress field will be dependent on both the fracture and pressure transient effects discussed above.

Methods of calculating the deformations resulting from a hydraulic fracture are reasonably well known in the art. Methods of calculating the deformations resulting from pressure transients are not well known. However, well known methods can be adapted for this purpose, as will be described later in the text. It is readily apparent that such calculations require knowledge of the material properties in the earth; and in the case where one or more fractures have been created then knowledge of their dimensions and orientation is also required.

In practice, knowledge of these properties is likely to be limited. It is a particular object of our invention to measure at least one parameter of the deformation at or below the surface of the earth, with which theoretical calculations can be compared; and hence to provide improved knowledge of material properties in the earth.

As a practical matter, if a pressure change is to be induced at a point in the subsurface by, say, the injection or production of fluids at that point, then some pipe or conduit or well must be provided for moving the fluids between the surface and that point. Methods for providing such wells and controlling fluid flow rates between the surface and a point in the subsurface are well known in the art, and our invention does not require any changes in these methods. One example of such a method is a well drilled from the surface or from an underground mine, together with such pumps, valves, pressure sensors and so on, as may be appropriate for the type of well. Flow at a point in the subsurface would be for instance through perforations in the casing of the well. The fluids in a well can be of many types, such as gases, liquids such as oil or water or selected chemicals, various mixtures of gases, liquids and solids, and so on, as is well known in the art.

There is, of course, an infinite number of possible combinations of properties in the subsurface, and the structure of the earth is not as simple as the accompanying drawings might suggest. From a study of these, however, together with the descriptive text which follows, the applicability of our invention to a wide range of conditions will become apparent.

Referring now to the drawings, FIG. 1 illustrates a typical embodiment of our invention. This represents a portion of the earth, in the form of a cube; the earth being denoted by the numeral 100 with its surface 21 horizontal. Horizontal axes X and Y, and vertical axis Z, represent one coordinate system which may be used to define the position of a point relative to another. A reference point for the coordinate system might be, say, point 61 having certain coordinates (X0,Y0,Z0).

Curve 50, which is dashed below the earth's surface and solid above, represents a conduit or well drilled into the earth and penetrating the earth's surface at some selected point 51. Well 50 is constructed so as to permit fluid flow into or from the subsurface of the earth at at least one selected point. One such point, having coordinates (X1,Y1,Z1) is denoted by the numeral 52. Well 50 also has equipment 53, F, to control fluid flow from the surface into or from the well, or between points in the well, and to measure and record some or all parameters of that fluid flow. The fluid flow is represented by arrows 54. Equipment F for controlling, measuring, and recording flow 54 comprises such valves, pumps, pressure sensors, and so on as are appropriate for the type of well 50. These valves et cetera are commonly installed at the surface point 51, or below the surface point 51, or at some remote location. All of this is well known in the art. Equipment F is so commonplace that it can be be regarded as being part of the well, and it will not be shown separately in subsequent drawings.

It will become apparent that there can be circumstances in which the flow of fluids is not controlled or not measured, but where our invention is still applicable.

Separately, a group or plurality of physical parameter sensors 55A, 55B, 55C. . . . 55N is arrayed on or below the surface 21 of the earth in a selected pattern at selected distances and directions from point 52 in the subsurface. These sensors can be of varied types for measuring mechanical movement of the earth such as displacement vertically or horizontally, or change of angle of tilt of the earth, and so on. Since the frequencies of variation of pressure and flow rate will be substantially of low frequency, the measurements at the sensors 55 will be substantially static rather than dynamic. The highest frequencies are likely to be in the range of less than one cycle per second.

For the purpose of description of our invention, the instruments 55 will be tiltmeters. They can be of various designs and sizes, some of which are designed to be installed in boreholes in the earth, so as to provide higher signal-to-noise ratio. Others, commonly of a lower sensitivity, can be placed closer to the surface or on the surface where they will be subjected to higher noise levels from wind and other ground disturbances but where they may be installed or moved at lower cost some types contain electronics inside the instrument, while others require external amplification, and so on. All of this is well known in the art.

The outputs of these various sensors, or tiltmeters, go to a central processing unit or CPU 57 by various methods which are well known in the art of geophysical measurements. Some such methods are illustrated in FIG. 1. Output from tiltmeter 55A goes to CPU 57 by means of a wire or cable 59, while tiltmeter 55D is equipped for wireless transmission such as via radio antenna 58. Tiltmeter 55C is equipped with a recording device, so that the data is sent to CPU 57 intermittently such as by some portable storage device, a portable computer for instance.

Tiltmeter 55B is at some depth below surface 21, at coordinates (X2,Y2,Z2). Dashed line 56 represents a method for transmitting data to surface 21, which might be for instance a wire or cable, or a data recording device to be retrieved together with the tiltmeter.

Fluid flow data may also go to CPU 57, as indicated by broken line 60.

Communication between CPU 57 and tiltmeters 55 or the flow control and measurement equipment F may be unidirectional as described above, or it may be bidirectional such that CPU 57 can also send data or control information to the tiltmeters or other equipment. This communication may be direct, such as by cable 59, or indirect, such as by human data entry at a keyboard.

CPU 57 may in practice comprise a number of different pieces of equipment which may be in different locations. Be that as it may, it would not affect the principle of operation, and for convenience CPU 57 will be described as a single unit. CPU 57 is a computing device commonly known as a Computer, capable of storing and processing data, communicating with humans, and so on, as is commonplace. Additional equipment may be provided for specific types of communication with tiltmeters 55 or flow control and measurement equipment F. All this is well known in the art of computing. By the use of a computer program or programs, CPU 57 can also be used to derive materials properties in the earth from the received tiltmeter and fluid flow data, as will be described later in the text.

In FIG. 2A is shown schematically a cross-section of the earth 100 with its surface 21 horizontal as in FIG. 1. At a depth D below surface 21 is a reservoir 24 with certain material properties. Reservoir 24 is discontinuous in one direction due to such as historical movement of a geological fault 25. In the other direction reservoir 24 contains a zone 26 through which fluid flows less readily than in the rest of reservoir 24, which might be because of a reduced permeability. Or zone 26 might for instance represent a known fluid of higher viscosity, and it may be desired to monitor the position of the interface between this fluid and the other fluids of reservoir 24 from time to time. Movement of the interface with time can be used to determine fluid flow in the reservoir.

A well, represented by dashed line 22 with flow control and measurement equipment (not shown), connects reservoir 24 to surface 21. A (optional) monitoring well 28 also connects reservoir 24 to surface 21, and a (optional) pressure sensor 29 is installed in monitoring well 28 at reservoir 24. Consider now that a selected fluid 23 is, say, injected into reservoir 24 through well 22, as shown in FIG. 2C.

Figure 2C:
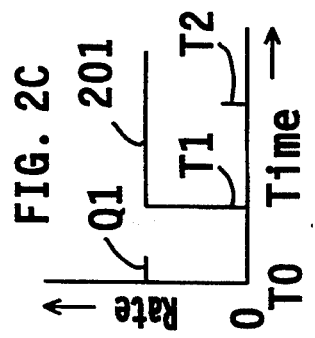
FIG. 2C Shows the injection rate of fluid into the well as a function of time.

FIG. 2C is a schematic plot with curve 201 showing the injection rate for fluid 23 versus time. At some certain time T0 the injection rate is zero and at time T1 injection commences at a certain rate Q1 and continues at this rate until at least a later time T2.

Refer now to FIG. 2B. The horizontal axis shows horizontal distance in each direction from well 22, at the same scale as FIG. 2A, with the vertical axis representing the position of well 22. The vertical axis shows pressure, denoted by letter P, at depth D in reservoir 24. P0 is the pressure in reservoir 24 at time T0, and for the sake of simplicity this pressure is denoted as being the same throughout the reservoir.

Curve 200 shows a one dimensional pressure profile in reservoir 24 at time T2. At time T2 the pressure at well 22 has increased to a value P1. At observation well 28 the pressure has increased to a lesser value P3, and the increase from P0 to P3 is recorded at pressure sensor 29. At discontinuity 25 the pressure has risen to P2 intermediate between pressures P1 and P3. Note the relatively large value of P2 which is because fluid cannot flow out through discontinuity 25. A change in the characteristic curvature of curve 200 is identified by numeral 202, and results from the different properties in zone 26. This illustrates how the shape of the pressure profile is dependent on the material properties in the reservoir, as is well known in the art of reservoir engineering.

Referring again to FIG. 2A, the pressure increase results in expansion (not shown) of reservoir 24, and deformation of the materials around and above reservoir 24 and up to surface 21 of the earth. Thus surface 21 will deform to a new shape such as for instance curve 27. The shape of curve 27 is clearly dependent on the shape of pressure profile 200 and hence on the mechanical properties of the fluid materials and solid materials in the reservoir, as well as on the mechanical properties of the material around and above the reservoir.

Consider a selected point 40 on surface 21, which might for instance be the location of a tiltmeter, at time T0. During time interval T1 to T2 the location of point 40 will move to point 41 on deformed surface 27, and arrows 42 and 44 indicate the magnitude of the vertical and horizontal displacements respectively. Angle 43 shows the change in slope, or tilt.

Curve 27 is greatly exaggerated for clarity, and it is important to point out that the actual value of tilt change 43 may be of the order of 1 microradian or so. Tilt changes of this order of magnitude over a time of the order of 1 hour would not be unusual for an aquifer at a depth of the order of 75 to 150 feet and for a pressure change P1 at the well of the order of 5 to 20 pounds per square inch. A tiltmeter fop this application should have the power to resolve change in tilt to 10 to 100 nanoradians. Tiltmeters that can make such minute measurements are well known in the art and can be obtained commercially. Once company which manufactures and sells such tiltmeters is Applied Geomechanics of Santa Cruz, Calif.

Figure 2D:
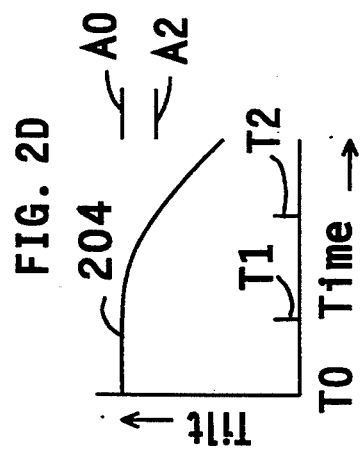
FIG. 2D Shows the angle of tilt at a point, as a function of time.

FIG. 2D is a schematic plot with curve 204 showing how the tilt at point 40 in FIG. 2A varies with time, using the sign convention that clockwise rotation is positive. From time T0 to T1 the tilt is shown as being constant at a certain angle A0, then decreasing due to deformation of the surface, reaching a value A2 at time T2. The difference between A2 and A0 is equal to angle 43. Note that the change in tilt with time does not follow a straight line, but rather a curve which relates to the manner in which the pressure transient in the reservoir varies with time.

The preceding discussion made the simplifying assumption that, in the absence of fluid injection starting at time T1, conditions in the subsurface would remain static.

Suppose now that fluid is being injected into reservoir 24 of FIG. 2A at time T0 at a selected rate, and at time T1 the rate is increased by an amount Q1; or that at time T0 fluid is being produced from reservoir 24 at a selected rate and at time T1 the production rate is decreased by an amount Q1. In these cases, increased injection rate or decreased production rate respectively cause pressure transients surface deformations, and tilt changes, similar to those described above. Such transients, surface deformations, and tilt changes will be relative to what would have occurred in the absence of this change in fluid flow rate.

It can also be seen that if the transients were generated by for instance reducing the production rate from an amount Q1 to zero, then the shape of the deformation would be relatively unaffected by small volumes of afterflow at the well bore or by desegregation of fluids in the well.

Refer now to FIG. 3A, which is a schematic diagram showing a horizontal section through the earth 100, at a selected depth. Numeral 30 represents a reservoir such as might have been created by the burial of an ancient river bed with boundaries 35 and reservoir 30 is penetrated by a well 31 equipped with flow control and measurement equipment (not shown). The material of the reservoir is permeable to fluid flow, while the surrounding material is not.

Now suppose that fluid is produced from reservoir 30 via well 31 at a selected rate for a certain time, say, T4, which might be of the order of 10 minutes to 6 hours, in order to generate pressure transients. Contours 34A, 34B 34C. . . . 34N join points of equal pressure drop after time T4 such that 34A is the greatest pressure drop and 34N is the least. The effect of the pressure drop is to cause a subsidence of the reservoir and deformation of the material around and above the reservoir.

FIG. 3B is a schematic diagram showing a horizontal cross section through the earth 1010 at a certain depth between the surface and that of FIG. 3A. FIG. 3B has the same linear scale and orientation as FIG. 3A, and is also penetrated by well 31 which is assumed to be vertical. The plane of the cross section deforms due to pressure drop in reservoir 24 and adopts a new shape such as shown by contours 32A,32B,32C. . . . 32N. These contours join points of equal vertical subsidence, such that 32A is the greatest subsidence and 32N is the least. Consider now arrows 33A, 33B,33C, . . . 33X. The point of each arrowhead represents a selected point in the subsurface, which might be the position of a tiltmeter. Each arrow 33 is a vector which points in the direction of tilt change and whose length is proportional to the magnitude of the tilt change in that direction, as might be recorded by a tiltmeter at that location.

Suppose now that the production of fluid from reservoir 30 in FIG. 3A occurs not deliberately, but by accident such as due to failure of the flow control equipment; and further that the accidental flow rate is not measured. There is no question but that deformation as shown in FIG. 3B will occur irrespective of whether or not the fluid flow is controlled or measured.

While the figures previously described are simplistic, they serve to illustrate that pressure transients cause surface and subsurface deformations whose shapes are dependent upon the material properties in the earth, and in particular upon those properties which control the manner in which the pressure transients are transmitted through the reservoir.

The final figure showing deformation, FIG. 4, illustrates a case where a hydraulic fracture is created. FIG. 4 is a vertical cross section through the earth 100, with the earth's surface 21 again shown as a horizontal plane. A plane at some depth D3 in the subsurface is denoted by the numeral 9. Dashed line 2 represents a well, with flow control and measurement equipment (not shown), and with provision for liquid flow into or from the earth 100 at a selected depth D4.

Suppose now that a selected fluid 3 is injected into well 2 at sufficient pressure to create a hydraulic fracture at depth D4. The fracture is here shown as having a symmetrical shape and vertical orientation and is denoted by numeral 4. A three dimensional view 16 of a portion of fracture 4 is provided to assist in the visualization of fracture 4, and for simplicity has an arbitary symmetrical shape. It is well known in the art that fractures created at shallow depths are inclined more or less towards the horizontal, while fractures created at greater depths are inclined more towards the vertical. Fracture 4 being shown as vertical, depth D4 is clearly greater than some minimum value, which may typically be of the order of 1000 to 1500 feet.

As in the previous pressure transient cases, fracture 4 creates stresses in the subsurface in all directions with resulting deformations. Thus the effect of fracture 4 is to deform plane 9 in the subsurface to a new contour such as dotted curve 10, and to deform surface 21 to a new contour such as dotted curve 5.

Arrows 6 indicate leak off, fluid leaking out of the fracture into the pore space of the surrounding material. This leak off causes pressure transients, which for simplicity are taken to be equal in both directions. As in the earlier cases, the transients cause stress changes which are transmitted in all directions. Thus the plane of surface 21 actually deforms according to the combined effects of fracture 4 and leak off 6, to a contour such as curve 8; and similarly, line of plane 9 deforms to a contour such as curve 11.

Consider now a selected point 12 on plane 9, which might for instance be the location of a tiltmeter. Due to the deformation, this point moves to a new Location 13 on curve 11, with vertical and horizontal displacements indicated by arrows 14 and 17, and with change of angle of tilt as indicated by angle 15. A change of tilt of the order of 1 microradian would not be unusual in the case of a hydraulic fracture at a depth D4 of the order of 2500 feet and for a point such as 12 at a depth D3 of the order of 10 feet. For such an application, the type of tiltmeter described with regard to FIG. 2A would be appropriate.

The principles of the discussion regarding FIG. 4 are equally applicable to the case where the hydraulic fracture is not vertical.

Referring back to FIG. 1, it will be recalled that by the use of a computer program or programs, CPU 57 can be used to derive material properties in the earth from the tiltmeter and fluid flow data. This is essential to our invention.

From the discussion of FIG. 2A and FIG. 2B above it is clear that additional parameters may be measured, which in this case is the pressure data recorded by pressure sensor 29 in observation well 28. The preferred embodiment of a program for CPU 57 permits the use of such information, flow data, and so on, in addition to the deformation data.

There is a multitude of types of computer, and there is a multitude of methods by which such a program could achieve the object of determining material properties in the earth from the deformation and other data. The description of one such program follows, which has been used on small portable machines commonly known as personal computers which are widely available at low cost. However, it will be clear that the basic method is not limited to any particular type of computer, or to any particular method for the calculation of deformations and so on. The described program does not require the use of any methods or algorithms which are not already well known.

In summary, the program first calculates theoretical values for the various data, based on some initial estimate of the values of the material properties in the earth. It then compares these theoretical values with the actual measurements, and uses this comparison to make improved estimates of the values of selected material properties in the earth. This process is typically repeated for as many times as necessary to match the theoretical data values to the measured values. In practice the actual data values are only measured to some certain accuracy, and the models used to describe the deformations and so on are not perfect. Thus the process is usually terminated when any further improvement in the match would be statistically meaningless.

Figure 5:
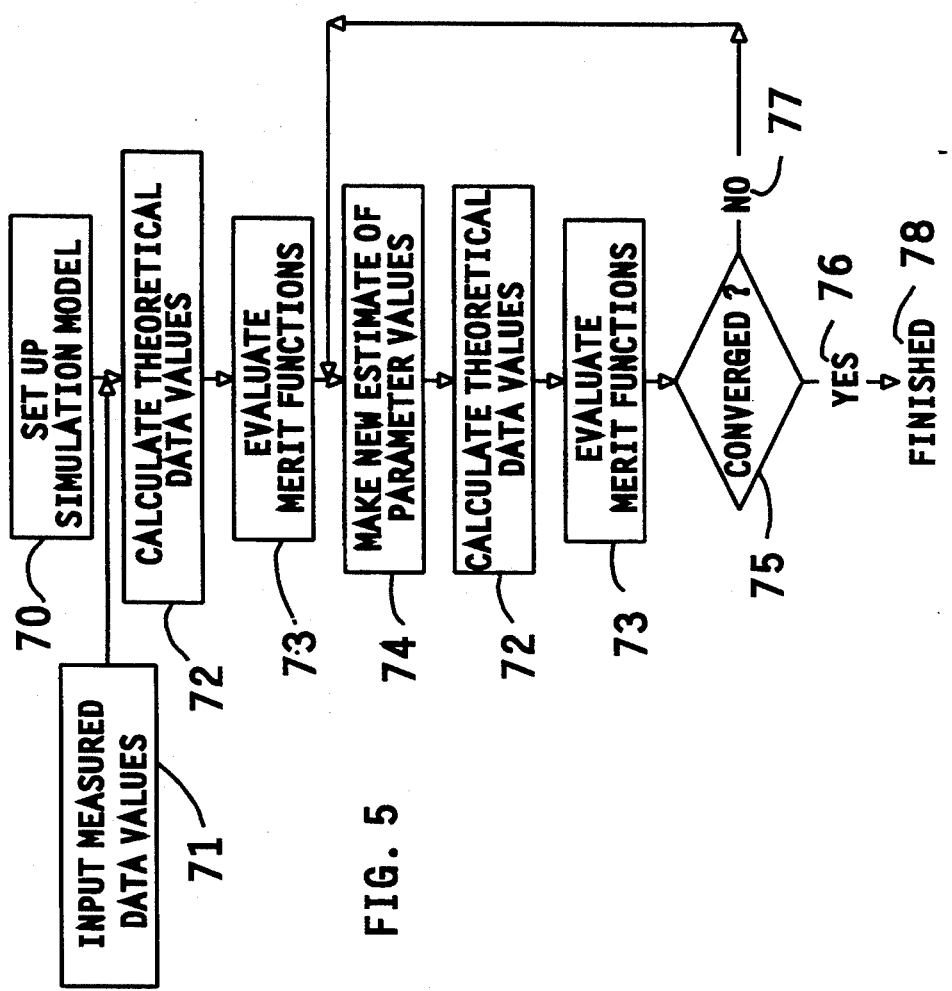
FIG. 5 Shows a flow diagram for a computer program using deformation data to determine materials properties.

This is illustrated in FIG. 5. Note that methods of computer data input and output are so commonplace that they are not shown or described here. The first step is to set up a simulation model, as indicated by numeral 70, with initial estimates of the material properties. Such properties include the thickness, dimensions, and permeability of the reservoir; mechanical properties of the rocks such as Poisson's ratio, and so on. At this stage the properties whose values are to be determined at selected points may also be selected, such properties might be for instance the distance and direction of no-flow barriers, position of an injected fluid volume, or permeabilites, et cetera. Numeral 71 indicates input of measured data values. This includes tilt data and other measured data. Such data as fluid flow rates or viscosities, for instance, may be used as input to the simulation model or to make initial estimates of properties which are to be determined.

The next step is calculate theoretical data values 72. Using the input parameter values, the simulation model calculates the theoretical shape of the pressure transients and the expansion or contraction of the reservoir, and hence the theoretical change in angle of tilt at the selected location of each tiltmeter. The simulation model will be described in more detail later in the text. The theoretical and measured data values are next compared, and the goodness of fit is determined according to some specified merit function or functions, as indicated by numeral 73.

The program then makes new estimates of the properties which are to be determined, as shown by numeral 74. Steps 72 and 73 are now repeated, to find the goodness of fit of the theoretical data values calculated using the new estimates of the material properties. A determination is now made as to whether convergence has been achieved, that is whether the process is considered complete or whether further improvements in the parameter values can be justified, as shown by numeral 75.

If the solution has not converged, then steps 74, 72, and 73, are repeated as shown by 77, no, then go to 74. If the solution has converged, then the program finishes as shown by yes 76 then finished 78.

The design of computer models for simulating pressure transients is well known in the arts of reservoir engineering and hydrology. A common type of model divides the reservoir into a certain number of grid blocks of specified shape and size, and the fluid flows between the blocks are calculated according to well known finite difference equations. The embodiment described here uses a particularly simple type of such a model, namely a single well radial model, such that the reservoir and fluid properties can be varied at different distances and directions from the well.

Having solved for the fluid flow and pressure change at each block, the uplift or subsidence at each block is calculated independently, using the method described by Palmer, which was referred to in the discussion of the prior art. Making the assumption that the deformation is elastic, the change of tilt at each tiltmeter is taken as the sum of the changes of tilt resulting from each grid block independently.

The uplift or subsidence at each grid block is treated as a horizontal dislocation of positive or negative thickness respectively, and the tilt at each point is calculated using the method of Yang and Davis described in the discussion of the prior art. In order to speed up computation, the deformation due to groups of grid blocks taken together may be used. The method of Yang and Davis applies only to a rectangular dislocation, but it is a matter of simple geometry to determine the shape of a rectangle which can reasonably be used to approximate the shape of the blocks.

If a hydraulic fracture is also to be modelled, then it also may be represented by one or more rectangular dislocations.

Thus a simulation model ms set up, and the theoretical fluid flows and pressures and theoretical tilts are calculated, as shown in steps 70 and 72 of FIG. 5.

Steps 73 and 74 require a scheme for comparing the theoretical values with the measured values and making improved estimates of the parameter values, and testing for convergence in step 75. Such schemes are well known in the art of numerical methods. A commonly used scheme is known as the Levenberg-Marquardt method, which is the method used in the embodiment described here. The merit funtion is the chi-square or weighted least squares difference between the theoretical and measured data. Weights can be ascribed to tilt and other data according to, for instance, the signal-to-noise ratios. Convergence is considered to be achieved when chi-square decreases by a specified small amount a specified number of times.

OPERATION—FIGS. 1, 2D, 5

FIG. 1 shows a group or plurality of sensors or tiltmeters 55 installed in a selected array. Selecting the locations for individual tiltmeters is done using steps 70, 71, and 72 of FIG. 5, except that set of input data values 71 may be in anticipated ranges of values rather than measured data. Various simulation models are set up and ranges of theoretical angles of tilt calculated for selected points on or below the surface of the earth. Thus theoretically suitable points are determined for the tiltmeter locations. These points may be for instance where the change in tilt is predicted to be large, thus yielding high signal-to-noise-ratios; or they may be such as to ensure good coverage of an area of particular interest, and so on.

It is not necessary for the array of tiltmeters to conform to any particular geometrical shapes, and the actual locations may be selected so as to be clear of inconvenient features of the terrain.

Each tiltmeter is commonly installed in a shallow borehole, typically at a depth of 3 to 15 feet, and packed around with sand. This is well known in the art. Methods of determining the actual location of each installed tiltmeter are well known in the art of surveying.

When transients are induced or occur, the measured tilt changes are analysed as described above, to determine the values of the material property or properties in the earth which may be of particular interest.

Referring again to FIG. 2D, it should be noted that the background tilt trend from time T0 to T1 is shown as a straight line. In many cases the tilt change can indeed be treated as the deviation from a linear trend. The surface and subsurface of the earth do in fact flex continuously due to such as tidal forces; and there may also be significant surface noise due to wind and weather, or ocean currents, or vehicular traffic, and so on. If necessary, various signal processing techniques may be applied in order to determine the tilt change. Such techniques include, for instance, filtering or forward or backward extrapolation methods as are well known in the arts of geophysics and numerical methods.

It also seen that curve 204 of FIG. 2D is curved rather than a straight line. Evaluating the tilt vectors as a function of time, or at a number of discrete times may yield additional information.

SUMMARY, RAMIFICATIONS, AND SCOPE

Accordingly the reader will see that the method and apparatus of our invention can be used to determine material properties of both solids and fluids in the earth and to map changes in those properties.

Although the description above contains many specificities, these should not be construed as limiting the scope of the invention but merely as providing illustrations of some of the presently preferred embodiments of this invention. For example, the simulation model can be of different types such as using finite element methods for the calculation of deformation or fluid flow, or of more complexity for modelling multiple wells, etc.; or the pressure transients could result from multiple changes of flow rate or continuously varying flow rate, etc.

Thus the scope of the invention should be determined by the appended claims and their legal equivalents, rather than by the examples given.

We claim:

1. The method of determining permeable material properties in the earth by measurement of deformations due to subsurface pressure changes resulting from the application of fluid pressure change at a selected point, at a selected depth D, in the earth, comprising the steps of:
   (a) positioning on the earth, at or beneath the surface thereof, a plurality of sensors for determining the change in angle of tilt of the earth at the positions of said sensors, in a selected array, of known positions with respect to said point of application of said fluid pressure change to the earth;
   (b) applying a fluid pressure change to the earth at said selected point, at a selected pressure P and flow rate F for a selected time T, or permitting said fluid pressure change to occur, thus generating pressure changes in the permeable material around said selected point, while
   (c) taking measurements of a function of the change of tilt in the earth at said positions of said sensors, and transferring said measurements to a computer equipped with program means for analyzing said measurements, and
   (d) using said program means to determine selected mechanical properties of solids and/or fluids at selected points in the earth.

2. The method as in claim 1 in which said depth D is greater than 75 feet.

3. The method as in claim 1 in which said depth D is less than 150 feet.

4. The method as in claim 1 in which said selected pressure P is of sufficient magnitude to create one or more new fractures in the earth.

5. The method as in claim 1 in which said selected pressure P is of such a magnitude as to cause the expansion or contraction of one or more fractures in the earth.

6. The method as in claim 1 in which said selected pressure P is of insufficient magnitude to cause the expansion or contraction of any fractures in the ear or to cause the creation of any new fractures in the earth.

7. The method as in claim 1 in which said selected pressure P is such as to cause the injection of fluid into the earth.

8. The method as in claim 1 in which said selected pressure P is such as to cause the production of fluid from the earth.

9. The method as in claim 1 in which said sensors are tiltmeters.

* * * * *